US012570161B2

(12) United States Patent (10) Patent No.: US 12,570,161 B2

Xu et al. (45) Date of Patent: Mar. 10, 2026

(54) CYCLE LIFE MANAGEMENT FOR MIXED CHEMISTRY VEHICLE BATTERY PACK

(71) Applicant: GM GLOBAL TECHNOLOGY OPERATIONS LLC, Detroit, MI (US)

(72) Inventors: Shuonan Xu, Troy, MI (US); Jun-mo Kang, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 350 days.

(21) Appl. No.: 18/448,498

(22) Filed: Aug. 11, 2023

(65) Prior Publication Data

US 2025/0050749 A1 Feb. 13, 2025

(51) Int. Cl.
| | |
|---|---|
| *B60L 50/15* | (2019.01) |
| *B60L 50/60* | (2019.01) |
| *B60L 58/12* | (2019.01) |
| *B60L 58/16* | (2019.01) |
| *B60W 10/08* | (2006.01) |

(52) U.S. Cl.
CPC .............. *B60L 50/15* (2019.02); *B60L 50/66* (2019.02); *B60L 58/12* (2019.02); *B60W 10/08* (2013.01); *B60L 58/16* (2019.02); *B60W 2510/244* (2013.01)

(58) Field of Classification Search
None
See application file for complete search history.

(56) References Cited

U.S. PATENT DOCUMENTS

| | | | |
|---|---|---|---|
| 2008/0111508 A1 | 5/2008 | Dasgupta et al. | |
| 2013/0057182 A1 | 3/2013 | Juan et al. | |
| 2014/0111121 A1* | 4/2014 | Wu ......... | B60L 50/40 |
| | | | 318/139 |
| 2016/0332530 A1* | 11/2016 | Roeder ......... | B60L 58/12 |
| 2020/0130511 A1* | 4/2020 | Botts ......... | B60L 58/22 |
| 2024/0034194 A1* | 2/2024 | Yang ......... | B60L 53/11 |

FOREIGN PATENT DOCUMENTS

DE 102009031295 A1 1/2011

* cited by examiner

Primary Examiner — Navid Z. Mehdizadeh
Assistant Examiner — Jason R Roberson
(74) Attorney, Agent, or Firm — Quinn IP Law

(57) ABSTRACT

A method for cycle life management of a mixed chemistry battery pack configured for electrically powering a traction motor of a vehicle. The method may include determining a driving load request made for requesting the mixed chemistry battery pack to provide a requested amount of electrical power to the traction motor for purposes of driving the vehicle and disconnecting the driving load request into a battery request suitable for providing the requested amount of electrical power from the mixed chemistry battery pack while managing a cycle life of the mixed chemistry battery pack independently of the driving load request.

20 Claims, 4 Drawing Sheets

CYCLE LIFE MANAGEMENT FOR MIXED CHEMISTRY VEHICLE BATTERY PACK

INTRODUCTION

The present disclosure relates to mixed chemistry battery packs, such as but not necessarily limited to mixed chemistry vehicle battery packs configured for electrically powering a traction motor of a vehicle.

A wide variety of rechargeable energy storage systems (RESSs) may be available for electrically powering a traction motor or other device operable for converting electrical power to mechanical power for purposes of propelling, driving, working, or otherwise operating a vehicle. Cycle life or a cycle life value, such as a C rate, may be used as a representation of how frequently and/or severely a RESS may be repeatedly charged and/or discharged. When in use, a RESS may experience degradation, efficiency decreases, slower performance, less capacity, and other types of potentially performance limiting effects as its cycle life increases.

SUMMARY

One non-limiting aspect of the present disclosure relates to managing cycle life for rechargeable energy storage systems (RESSs), such as but not necessarily to managing RESSs for purposes of minimizing degradation, efficiency decreases, slower power delivery, less capacity, and other types of potentially performance limiting effects resulting from repetitive use. The contemplated cycle life management may be beneficial with a wide variety of RESSs, and in particularly with mixed chemistry packs used to store and supply electrical power for traction motors or other devices operable for propelling, driving, working, or otherwise operating a vehicle. A mixed chemistry pack may correspond with a pack having multiple subpacks with one more of the subpacks having a different configuration, capability, chemical construction, etc. than the other subpacks. One type of subpack, for example, may perform electrochemical reactions suitable for supplying and/or storing electrical power at different maximum power levels, consistent power levels, etc., e.g., one subpack may be configured for providing less maximum power than another subpack but with longer consistent power.

One non-limiting aspect of the present disclosure relates to a method for cycle life management of a mixed chemistry battery pack configured for electrically powering a traction motor of a vehicle. The method may include determining a driving load request made for requesting the mixed chemistry battery pack to provide a requested amount of electrical power to the traction motor for purposes of driving the vehicle and generate a battery request suitable for providing the requested amount of electrical power from the mixed chemistry battery pack while managing a cycle life of the mixed chemistry battery pack independently of the driving load request.

The battery request may be operable for maximizing the cycle life by prioritizing charging and discharging of the propulsion subpack over the energy subpack.

The method may include determining a state of charge (SOC) threshold for a propulsion subpack and determining a nominal current limit and a maximum current limit for an energy subpack configured for providing less maximum power than the propulsion subpack and longer consistent power than the propulsion subpack. The battery request may be operable for controlling the propulsion subpack to supply electrical power to meet the requested amount of electrical power without electrical power assistance from the energy subpack during a first power stage occurring prior to an SOC of the propulsion subpack reaching an upper limit of the SOC threshold, controlling the energy subpack to provide an assistive amount of electrical power to supplement the propulsion subpack in meeting the requested amount of electrical power without exceeding the nominal current limit during a second power stage occurring after the first power stage upon the SOC reaching the upper limit and prior to surpassing a lower limit of the SOC threshold, and controlling the energy subpack to provide the assistive amount according to a relaxed current limit during a third power stage occurring after the second power stage upon the SOC reaching the lower limit and prior to the SOC surpassing the upper limit, the relaxed current limit being greater than the nominal current and equal to or less than the maximum current limit.

The battery request may be further operable for controlling the energy subpack to provide the assistive amount without exceeding the nominal current limit during a fourth power stage occurring after the third power stage upon the SOC reaching the upper limit.

The method may include adjusting the relaxed current limit during the third power stage in proportion to the SOC increasing from the lower limit to the upper limit.

The method may include adjusting the relaxed current limit during the third power stage at a predetermined rate as the SOC increases from the lower limit to the upper limit.

The method may include determining a charging load request made for requesting the energy subpack to provide a charging amount of electrical power to the propulsion subpack for purposes of charging the propulsion subpack and generating a charging request operable for controlling the energy subpack to provide the charging amount of electrical power to the propulsion subpack.

The method may include determining the charging load request in response to the vehicle being stationary for a predefined period of time, the SOC is at or below the lower limit, and direct current fast charging of the propulsion subpack is unavailable.

The charging request may be operable for controlling the energy subpack to provide the charging amount of electrical power without exceeding the nominal charging limit.

The charging request may be operable for controlling the energy subpack to provide the charging amount of electrical power at a selectable rate.

The method may include determining a warming load request made for requesting the energy subpack to provide a warming amount of electrical power to the propulsion subpack for purposes of warming the propulsion subpack and generating a warming request operable for controlling the energy subpack to provide the warming amount of electrical power to the propulsion subpack.

The method may include determining the warming load request in response to the vehicle being stationary for a predefined period of time while direct current fast charging of the propulsion subpack is unavailable.

The battery request may be operable for controller a converter of the mixed chemistry battery pack to control electrical power transfer between the propulsion subpack and the energy subpack.

The converter may be a direct current (DC)-to-DC converter connected in parallel between the propulsion subpack and the energy subpack.

One non-limiting aspect of the present disclosure relates to a cycle life managed mixed chemistry battery pack configured for electrically powering a traction motor of a vehicle. The pack may include a propulsion subpack, an energy subpack, a converter configured for controlling electrical power transfer from the energy subpack to the propulsion subpack, and a controller. The controller may be configured for determining a driving load request made for requesting the mixed chemistry battery pack to provide a requested amount of electrical power to the traction motor for purposes of driving the vehicle and generating a battery request suitable for providing the requested amount of electrical power from the mixed chemistry battery pack while managing a cycle life of the mixed chemistry battery pack independently of the driving load request.

The controller may be configured for maximizing the cycle life by minimizing charging and discharging of the energy subpack relative to the energy subpack.

The controller may be configured for determining a state of charge (SOC) threshold for the propulsion subpack and determining a nominal current limit and a maximum current limit for the energy subpack configured for providing less maximum power than the propulsion subpack and longer consistent power than the propulsion subpack.

The battery request may be operable for controlling the propulsion subpack to supply electrical power to meet the requested amount of electrical power without electrical power assistance from the energy subpack during a first power stage occurring prior to an SOC of the propulsion subpack reaching an upper limit of the SOC threshold, controlling the energy subpack to provide an assistive amount of electrical power to supplement the propulsion subpack in meeting the requested amount of electrical power without exceeding the nominal current limit during a second power stage occurring after the first power stage upon the SOC reaching the upper limit and prior to surpassing a lower limit of the SOC threshold, and controlling the energy subpack to provide the assistive amount according to a relaxed current limit during a third power stage occurring after the second power stage upon the SOC reaching the lower limit and prior to the SOC surpassing the upper limit, the relaxed current limit being greater than the nominal current and equal to or less than the maximum current limit.

The battery request may be operable for controlling the energy subpack to provide the assistive amount without exceeding the nominal current limit during a fourth power stage occurring after the third power stage upon the SOC reaching the upper limit.

One non-limiting aspect of the present disclosure relates to a cycle life managed electrical power system for powering a traction motor of a vehicle. The system may include a mixed chemistry battery pack having a propulsion subpack, an energy subpack, and a converter configured for controlling electrical power transfer from the energy subpack to the propulsion subpack. The system may further include a controller configured for determining a driving load request made for requesting the mixed chemistry battery pack to provide a requested amount of electrical power to the traction motor for purposes of driving the vehicle and generating a battery request in response to the driving load request, the battery request being suitable for providing the requested amount of electrical power from the mixed chemistry battery pack while managing a cycle life of the mixed chemistry battery pack.

The controller may be configured for determining a state of charge (SOC) threshold for the propulsion subpack and determining a nominal current limit and a maximum current limit for the energy subpack when configured for providing less maximum power than the propulsion subpack and longer consistent power than the propulsion subpack. The battery request may be operable for controlling the propulsion subpack to supply electrical power to meet the requested amount of electrical power without electrical power assistance from the energy subpack during a first power stage occurring prior to an SOC of the propulsion subpack reaching an upper limit of the SOC threshold, controlling the energy subpack to provide an assistive amount of electrical power to supplement the propulsion subpack in meeting the requested amount of electrical power without exceeding the nominal current limit during a second power stage occurring after the first power stage upon the SOC reaching the upper limit and prior to surpassing a lower limit of the SOC threshold, controlling the energy subpack to provide the assistive amount according to a relaxed current limit during a third power stage occurring after the second power stage upon the SOC reaching the lower limit and prior to the SOC surpassing the upper limit, and controlling the energy subpack to provide the assistive amount without exceeding the nominal current limit during a fourth power stage occurring after the third power stage upon the SOC reaching the upper limit.

These features and advantages, along with other features and advantages of the present teachings, may be readily apparent from the following detailed description of the modes for carrying out the present teachings when taken in connection with the accompanying drawings. It should be understood that even though the following figures and embodiments may be separately described, single features thereof may be combined to additional embodiments.

BRIEF DESCRIPTION OF THE DRAWINGS

The accompanying drawings, which may be incorporated into and constitute a part of this specification, illustrate implementations of the disclosure and together with the description, serve to explain the principles of the disclosure.

DETAILED DESCRIPTION

As required, detailed embodiments of the present disclosure may be disclosed herein; however, it may be to be understood that the disclosed embodiments may be merely exemplary of the disclosure that may be embodied in various and alternative forms. The figures may not be necessarily to scale; some features may be exaggerated or minimized to show details of particular components. Therefore, specific structural and functional details disclosed herein may be not to be interpreted as limiting, but merely as a representative basis for teaching one skilled in the art to variously employ the present disclosure.

Figure 1:
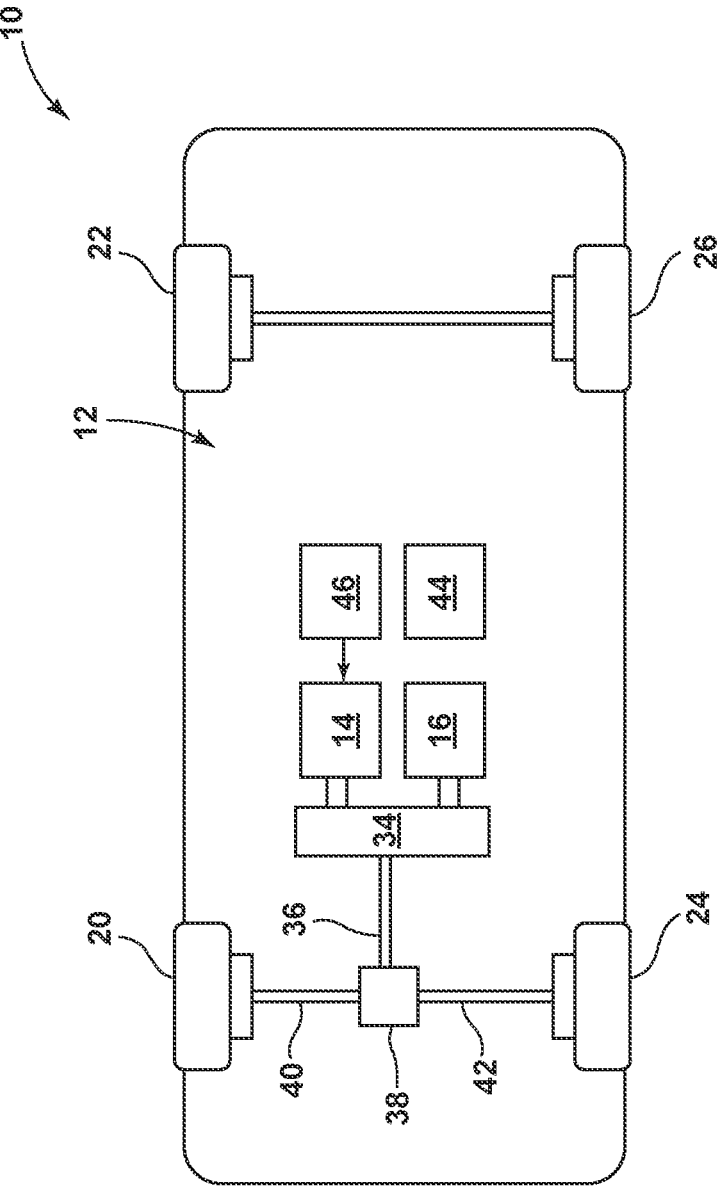
FIG. 1 illustrates a schematic view of a vehicle in accordance with one non-limiting aspect of the present disclosure.

FIG. 1 illustrates a schematic view of a vehicle 10 in accordance with one non-limiting aspect of the present disclosure. The vehicle 10 may be configured with a propulsion system, powertrain, or other drivetrain 12 having an electric motor 14 or other electrically driven device operable for propelling or otherwise driving the vehicle 10. The vehicle 10 is illustrated as a hybrid type due to the powertrain 12 optionally including an internal combustion engine (ICE) 16. The ICE 16 and the electric motor 14, or other device configured to convert electrical power to mechanical power, may cooperate to provide mechanical force/torque to the powertrain 12 for conveyance to one or more of a plurality of wheels 20, 22, 24, 26. The powertrain 12 may include a transmission 34, a driveshaft 36, a differential 38, axles 40, 42, and/or other componentry to facilitate conveying rotative force from the ICE 16 and/or the motor 14 to the wheels 20, 22, 24, 26. The vehicle 10 is shown to include the powertrain 12 operable with the front wheels 20, 24 for non-limiting purposes as the present disclosure fully contemplates its use and application with four-wheel drive automobiles and other, non-automobile types of vehicles. A controller 44 may be configured to generate control signals associated with directing and otherwise implementing desired control of the powertrain 12, the motor 14, the ICE 16, and/or other features of the vehicle 10, e.g., the controller 44 may include non-transitory instructions stored on an associated computer-readable storage medium, which when executed with one or more processors, may be operable to facilitate the operations, processes, controls, etc. described herein.

The vehicle 10 is representative of a wide variety of vehicles and/or other devices that may rely on converting electrical power to mechanical power. Such vehicles may be generically referred to as electric vehicles and include a wide range of capabilities for supporting the conversion of electrical power to mechanical power, including electric vehicles of the type that may operate without assistance from the ICE 16. The vehicle 10 is contemplated to include differing configurations for generating, storing, and supplying electrical power to the electric motor 14 and/or other devices or systems onboard and offboard the vehicle 10. The present disclosure contemplates some or an entirety of the electrical power being provided at least based in part on electrical power derived from a rechargeable energy storage systems (RESSs) 46. The controller 44 may be configured for managing operation of the RESS 46 so as to optimize its cycle life, such as by managing the charging and discharging thereof to minimize degradation, efficiency decreases, slower power delivery, less capacity, and other types of potentially performance limiting effects that may arise from repetitive use. While the present disclosure fully contemplates its use and application with a wide range of RESSs, the RESS 46 is predominately described with respect to being configured as a mixed chemistry battery pack 46.

Figure 2:
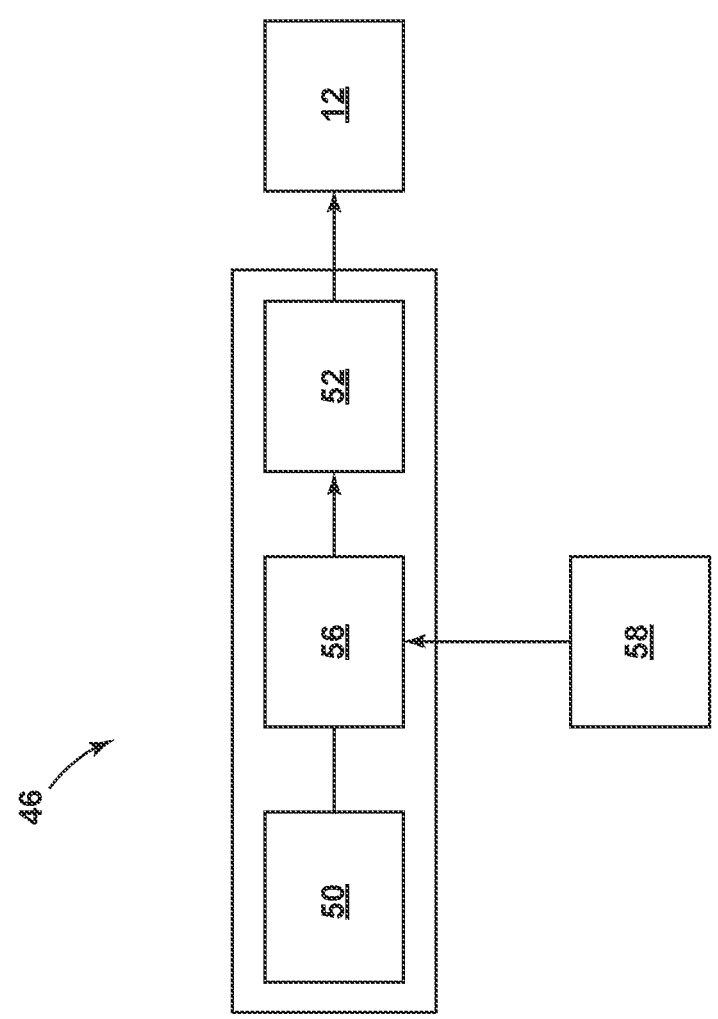
FIG. 2 illustrates a schematic view of a mixed chemistry battery pack in accordance with one non-limiting aspect of the present disclosure.

FIG. 2 illustrates a schematic view of the mixed chemistry battery pack 46 in accordance with one non-limiting aspect of the present disclosure. The mixed chemistry battery pack 46 may be included as part of a control architecture associated with exchanging electrical power with the motor 14 and/or other devices in communication with the vehicle 10. As one skilled in the art may appreciate, the mixed chemistry battery pack 46 and the described management thereof may be beneficial with a wide variety of applications, devices, vehicles, etc. beyond the description provided herein with respect to the vehicle 10. The mixed chemistry battery pack 46 may be configured for relying at least partially upon electrochemical reactions to facilitate storing and supplying electrical power. The mixed chemistry battery pack 46 may be considered to be mixed insofar as including multiple subpacks 50, 52, with each subpack 50, 52 being configured to perform electrochemical reactions suitable for storing and supplying electrical power. While the present disclosure fully contemplates the use of more subpacks 50.

52, the mixed chemistry battery pack 46 is shown to include a first subpack 50 and a second subpack 52. The first subpack 50 may be referred to as an energy subpack 50 and the second subpack 52 may be referred to as a propulsion subpack 52.

To facilitate managing the cycle life of the mixed chemistry battery pack 46, the energy and propulsion subpacks 50, 52 may have differing configurations, capabilities, chemical construction, etc. for performing the electrochemical reactions associated with supplying and/or storing electrical power. The related differences between the subpacks 50, 52 may be selectively determined and leveraged to facilitate managing the cycle life of the mixed chemistry battery pack 46 as a whole. The subpacks 50, 52, for example, may be relatedly configured to support different maximum power levels, consistent power levels, etc., e.g., the energy subpack 50 may be configured for providing less maximum power than the propulsion subpack 52 but with a longer consistent power than the propulsion subpack 52. The energy subpack 50 may have less maximum power but more energy than the propulsion subpack 52 such that a smaller propulsion subpack 52 may be used for rapid and demanding power request, which may in turn help prolong the larger energy subpack 50. The cycle life management contemplated herein may leverage the differing characteristics of the subpacks 50, 52 to facilitate long-term maximization and operation of the mixed chemistry battery pack 46, such as by prioritizing charging and discharging of the propulsion subpack 52 over the energy subpack 50. The capability to individually control the charging and discharging of the subpacks 50, 52, optionally on a disparate or uneven basis, may be beneficial in selectively managing the use thereof according to conditions most suitable to enhancing cycle life.

The present disclosure contemplates enhancing cycle life of the mixed chemistry battery pack 46 by selectively and independently managing the discharging and charging of the energy and propulsion subpacks 50, 52, such as in a manner that capitalizes on their disparate operating characteristics while also promoting cycle life. This may be done, for example, by partitioning use of the subpacks 50, 52 to meet requested power demands in a manner that allows the capabilities of each subpack to be utilized for purposes of enhancing overall cycle life of the mixed chemistry battery pack 46, e.g., prioritizing use of the propulsion subpack 52 over the energy subpack 50 or vice versa. The mixed chemistry battery pack 46 is shown with the energy subpack 50 connected in parallel with the propulsion subpack 52 and a converter 56 therebetween to regulate current flow. The converter 56, for example, may be configured as a direct-current (DC)-to-DC converter 56, such as a buck-boost converter 56, a switch, or other circuit construct operable to manage current flow from the energy subpack 50 to the propulsion subpack 52 and/or from the propulsion subpack 52 to the energy subpack 50. The converter 56 may be configured to control power flow between the energy and propulsion subpacks 50, 52 according to commands received from the controller 44 and/or a motor power controller (MPC) 58. The MPC 58 may be included as part of the controller 44 and/or a standalone unit configured to operate the mixed chemistry battery pack 46 according to the management contemplated herein.

The commands generated by the MPC 58 to control the mixed chemistry battery pack 46, or more particularly the converter 56, energy subpack 50, and/or propulsion subpack 52, may be generated in multiple forms, including as a signal, such as a pulse-with modulated (PWM) signal, operable for selectively opening and closing included switches or other circuits and componentry (not shown). The MPC 58 and/or the mixed chemistry battery pack 46 may include sensors, feedback, and/or other mechanisms (not shown) operable for sensing, calculating, predicting, and otherwise executing logical operations associated with monitoring operations of the mixed chemistry battery pack 46, the vehicle 10, etc. for purposes of facilitating the management contemplated herein. The MPC 58, for example, may be configured for calculating or otherwise determining a state of charge (SOC) for the subpacks 50, 52, load request or demand for providing electrical power to and/or from the mixed chemistry battery pack 46, current limits for the subpacks 50, 52, and/or a wide variety of other variables operable for use in directing the mixed chemistry battery pack 46 according to the cycle life management contemplated herein. The controller 44 and/or the MPC 58 may include corresponding non-transitory instructions operable for generating corresponding commands, instructions, etc.

Figure 3:
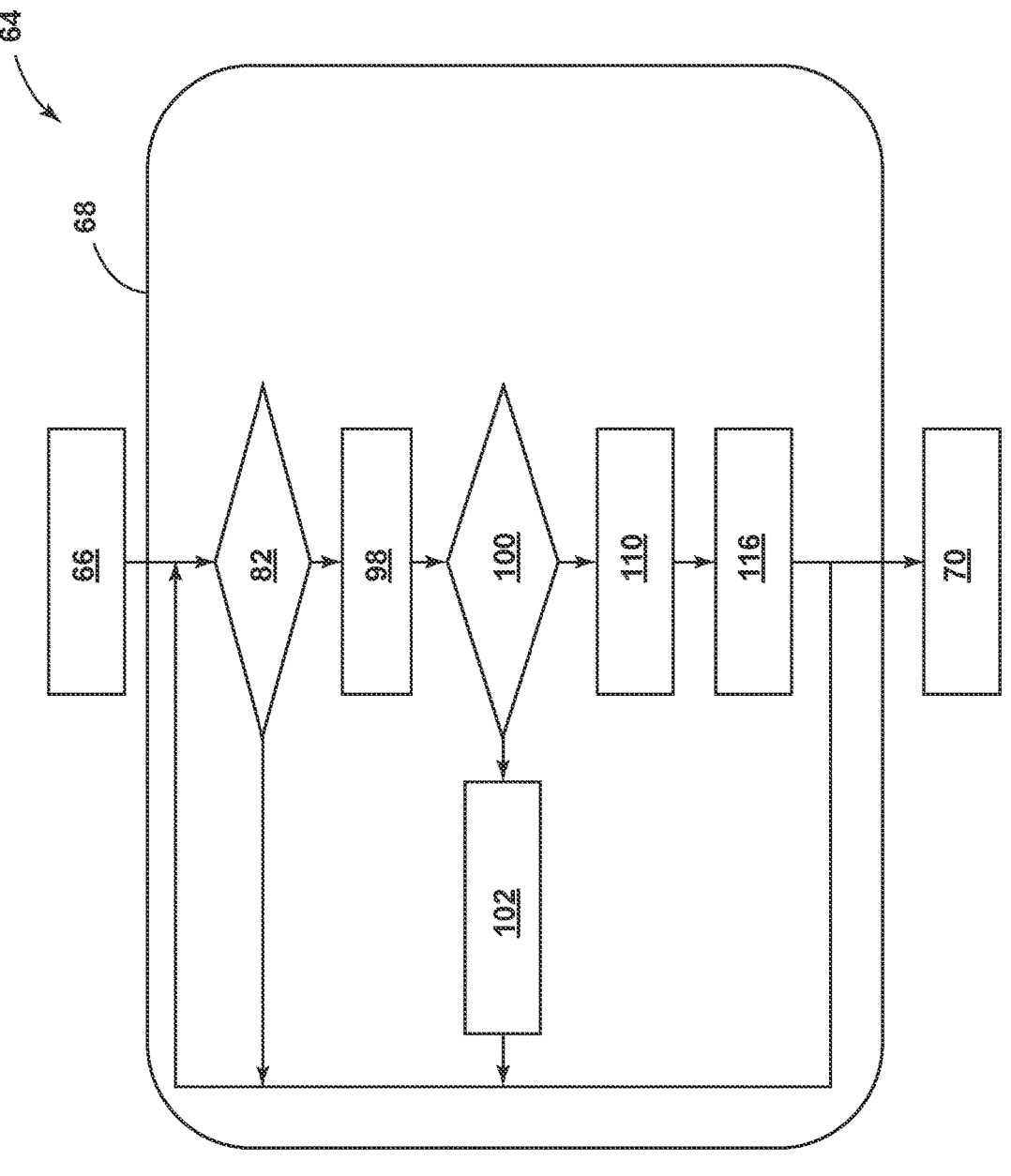
FIG. 3 illustrates a flowchart of a method for cycle life in accordance with one non-limiting aspect of the present disclosure.

FIG. 3 illustrates a flowchart of a method 64 for cycle life management of the mixed chemistry battery pack 46 in accordance with one non-limiting aspect of the present disclosure. Block 66 relates to a load request process whereby the MPC 58 may determine a load or other type of request made for requesting the mixed chemistry battery pack 46 to provide a requested amount of electric power to the motor 14 or other feature onboard the vehicle 10, which may be referred to as a driving load request when made for demanding electrical power to be used in driving the vehicle 10. The driving load request may be made be determined by the MPC 58 directly and/or indirectly via the controller 44, e.g., the controller 44 may receive a demand from a driver or another operator, e.g., an autonomous system. Block 68 relates to a battery request process whereby the MPC 58 may generate a battery request suitable for controlling the mixed chemistry battery pack 46 to provide the requested amount of electrical power. The battery request process may include disconnecting the driving load request from the battery request so that the battery request may be independently generated. The battery request, for example, may include control parameters separately generated from parameters defined in the driving load request to enable management of cycle life independently of the driving load request. Block 70 relates to a powering process whereby the mixed chemistry battery pack 46 may be controlled to meet the driving load request, i.e., to provide the requested power, according to parameters delineated in the battery request.

Figure 4:
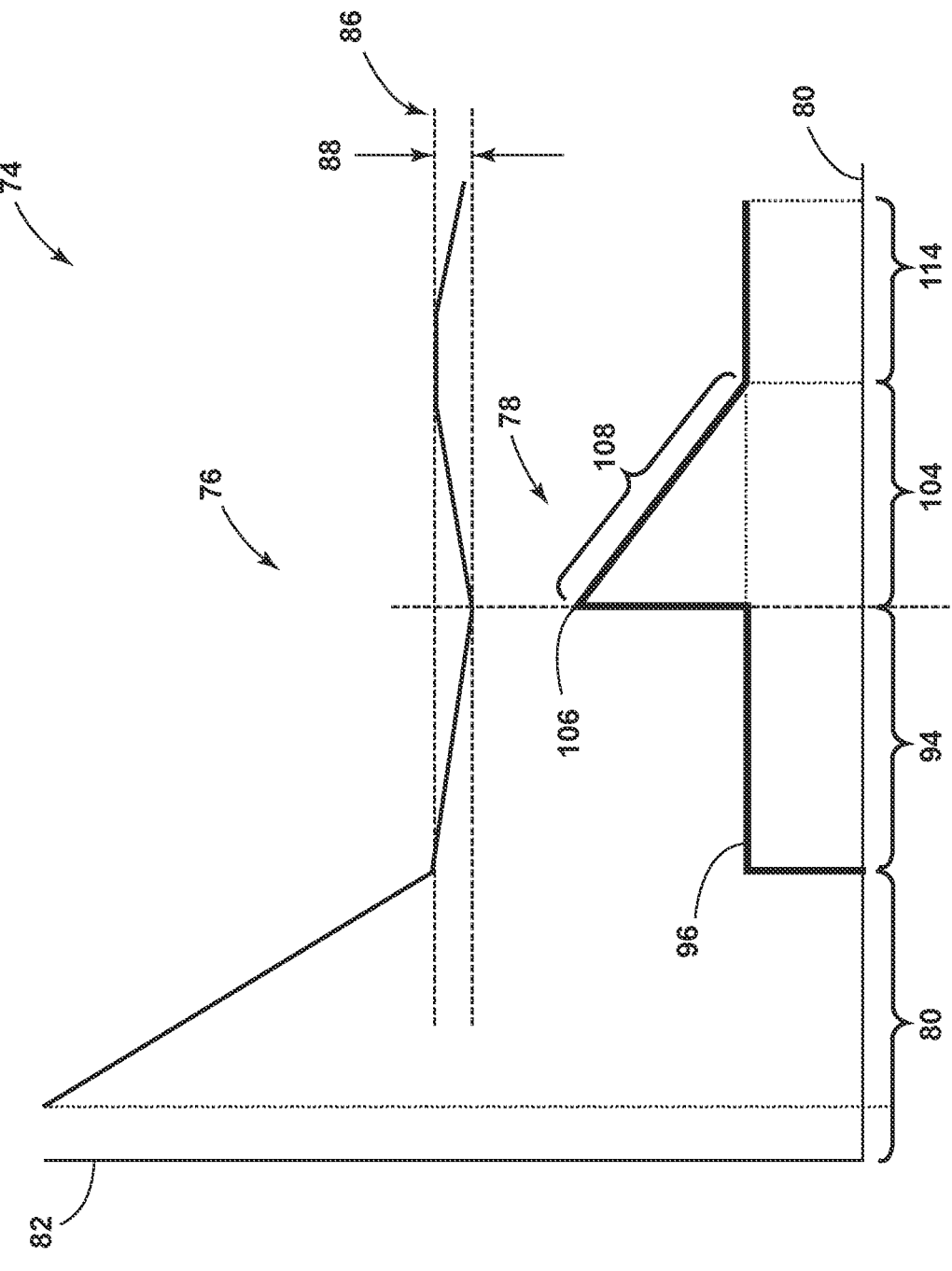
FIG. 4 illustrates a power diagram associated with generating a battery request in accordance with one non-limiting aspect of the present disclosure.

FIG. 4 illustrates a power diagram 74 associated with generating the battery request in accordance with one non-limiting aspect of the present disclosure. The diagram 74 may include a propulsion graph 76 for reflecting desired operation of the propulsion subpack 52 and an energy graph 78 for reflecting desired operation of the energy subpack 50. The graphs 76, 78 are shown for exemplary purposes relative to a horizontal axis 80 marking time and a vertical axis 82 representing SOC for the propulsion graph 76 and current discharge for the energy graph 78. The horizontal axis 80 may represent a period of time associated with the mixed chemistry battery pack 46 being controlled during a charging event to provide electrical power in an attempt to meet the driving load request, such as while the powering process of Block 70 is ongoing. The mixed SOC and current discharge metrics of the vertical axis 82 may be presented to reflect relative changes in the energy and propulsion subpacks 50, 52 over time while the mixed chemistry battery pack 46 provides electrical power. The battery request may be derived from the propulsion and energy graphs 76, 78 and adjusted throughout the powering process to facilitate managing cycle life of the mixed chemistry battery pack 46. The battery request may be generated by the MPC 58 based on the driving load request but optionally in an independent manner to enable the electrical power to be partitioned between the subpacks 50, 52. Based on the selected chemistries, capabilities, etc. of the propulsion and energy subpacks 50, 52, which may vary, the present disclosure contemplates maximizing cycle life by prioritizing charging and discharging of the propulsion subpack 52 over the energy subpack 50.

To this end, a beginning of a first power stage 80 may be used to mark a beginning whereby the propulsion subpack 52 may be depended upon to entirely provide the requested amount of electrical power, i.e., to meet the driving load request without electrical power being simultaneously sourced from the energy subpack 50. Returning to FIG. 3, Block 82 relates to a setpoint process that may be included as part of the first power stage 80. The setpoint process may include the MPC 58 setting an SOC threshold 86 for the propulsion subpack 52 and thereafter monitoring SOC of the propulsion subpack 52 to determine whether the SOC is approaching the SOC threshold 86, i.e., the SOC of the propulsion subpack 52 may decrease over time as the propulsion subpack 52 continues to be solely used for providing the requested amount of electrical power. As shown in FIG. 4, the SOC threshold 86 may include an upper limit 88 and a lower limit 90, with the upper limit 88 specifying an SOC value desired for the propulsion subpack 52 to reach before the energy subpack 50 is controlled to provide an assistant amount of electrical power in supplement thereof. The SOC threshold 86 and/or the upper and lower limits 88, 90 may be selectable depending on desired operating conditions, current environmental influences, vehicle performance strategies, and an extensive number of other variables, which may vary and/or be adjusted in real time or to meet other operating desired abilities.

A second power stage 94 may correspond with controlling the energy subpack 50 to provide an assistive amount of electrical power to supplement the propulsion subpack 52 in meeting the requested amount of electrical power, which may occur with the energy subpack 50 providing the assistive amount of electrical power without exceeding a nominal current limit 96. Returning to FIG. 3, Block 98 may relate to a current control process whereby the MPC 58 determines the nominal current for the energy subpack 50. The nominal current 96 may correspond with a predefined amount of current to be provided from the energy subpack 50 during the second power stage 94, i.e., after the SOC of the propulsion subpack 52 reaches the upper limit 88 and before the SOC reaches the lower limit 90. The current control process may determine the nominal current 96 according to design parameters, current operating conditions, state of health (SOH), and/or according to other design parameters. Block 100 relates to a monitoring process whereby the MPC 58 may monitor the SOC of the propulsion subpack 52 to determine whether the assistive amount of electrical power being provided at the nominal current 96 has resulted in the SOC approaching or exceeding one of the upper and lower limits 88, 90. Block 102 relates to a current adjustment process whereby the MPC 58 may commence a third power stage 104 upon the SOC reaching the lower limit 90 and prior to the SOC exceeding the upper limit 88. The current adjustment process may include permitting the energy subpack 50 to initially operate according to a maximum current 106 in Block 102 when SOC reaches the lower limit 88 and thereafter upon the SOC increasing according to a lesser, relaxed current 108 in Block 110. Like the nominal current 96, the maximum and the relaxed currents 106, 108 may be design parameters selected according to wide variety of operating considerations, including a desirable upper range or limitation upon the energy subpack 50 to manage cycle life.

Returning to FIG. 4, the third power stage 104 may correspond with changing current limitations on the energy subpack 50 from the nominal current 96 to the maximum current 106 and thereafter decaying from the maximum current 106 to the relaxed current 108 until the SOC reaches the upper limit 88. The third power stage 104 may occur when the assistive power provided according to the nominal current 96 during the second power stage 94 results in the SOC continuing to decrease and approach the lower limit 90. The power output of the energy subpack 50 during the third power stage 104 may be correspondingly increased in proportion to a difference between the nominal current 96 and the maximum current 106 and thereafter according to the relaxed current 108, which may in turn alleviate some of the powering burden placed on the propulsion subpack 52. The SOC of the propulsion subpack 52 may increase in response to the increasing assistive power provided by the energy subpack 50 such that the relaxed current 108 may be proportionately decreased as the SOC increases and approaches the upper limit 88. Upon the SOC reaching the upper limit 88, a fourth power stage 114 may commence whereupon the minimum current 96 may be returned to for metering the assistive power provided from the energy subpack 50.

Returning to FIG. 3, Block 116 relates to controlling the energy subpack 50 to provide the assistive amount of electrical power without exceeding the nominal current 96. In the event the SOC continues to increase above the upper limit 88, the nominal current 96 may optionally be adjusted and/or the assistive use of the energy subpack 50 may be discontinued. In the event demand increases or other situations arise causing the SOC to continue decreasing towards the lower limit 90, the above processes may be repeated, e.g., the energy subpack 50 may be engaged to provide assistive electrical power in supplement of the propulsion energy subpack 50, i.e., according to the minimum, relaxed, and/or maximum currents 96, 106, 108. While the foregoing methods for cycle life management may be predominantly based on utilizing the energy subpack 50 to provide assistive electrical power in supplement of electrical power being provided from the propulsion subpack 52, which may require corresponding control of the converter 56, the present disclosure fully contemplates other methodologies for partitioning energy supply between the energy and propulsion subpack 52.

As reported above, one aspect of the present disclosure relates to a parallel connected mixed chemistry battery pack, with a the 'propulsion' cell/subpack connected to a load directly while an 'energy' cell/subpack is connected to the load via a DC-DC converter. This creates an opportunity to 'disconnect' the load of the energy cells from the road load request, and thereby support a methodology to reduce the load on the energy cells so that the cycle life of that cell type can be maximized. The energy cells used in mixed chemistry pack may be advanced chemistry cells with relatively low cycle life (e.g., LMB, Si anode). This method provides an approach to improve the cycle life of the energy cells by lowering its discharge C rate when feasible, e.g., when demands can be met with the propulsion cell. The contemplated approach may include disconnecting the battery load from the road load so that the discharge current can be kept at a lower level, controlling the discharge of the energy cells such that the SOC of propulsion cell can be maintained at the target level at the same time, and allowing energy cells to slowly charge up the propulsion cells at certain conditions when the vehicle is not in motion.

At cold ambient conditions, the propulsion cells may experience SOC limitations if the cell temperature is too low. In such a scenario when the vehicle is not in motion, power from the energy cells may be used to maintain the temperature of the propulsion cells above a min threshold (customer selectable feature). This may include the MPC determining a warming load request made for requesting the energy subpack to provide a warming amount of electrical power to the propulsion subpack for purposes of warming the propulsion subpack and generating a warming request operable for controlling the energy subpack to provide the warming amount of electrical power to the propulsion subpack. The warming load request may be determined in response to the vehicle being stationary for a predefined period of time while direct current fast charging of the propulsion subpack is unavailable.

A variable converter current limiter algorithm be implemented with the MPC to limit the discharge current of energy cells whenever possible while ensuring the propulsion cells stays with target SOC window. When vehicle is not in motion, the propulsion cells are at min SOC threshold (vehicle in range extension mode), and DC fast charging (DCFC) is not present, the propulsion cells may be charged using the energy cells with controlled rate (customer selectable feature). This may include the MPC determining a charging load request made for requesting the energy subpack to provide a charging amount of electrical power to the propulsion subpack for purposes of charging the propulsion subpack and generating a charging request operable for controlling the energy subpack to provide the charging amount of electrical power to the propulsion subpack. The charging load request may be determined in response to the vehicle being stationary for a predefined period of time, the SOC is at or below the lower limit, and direct current fast charging of the propulsion subpack is unavailable. The charging request may be operable for controlling the energy subpack to provide the charging amount of electrical power without exceeding the nominal charging limit and/or at a selectable rate.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. "A", "an", "the", "at least one", and "one or more" are used interchangeably to indicate that at least one of the items is present. A plurality of such items may be present unless the context clearly indicates otherwise. All values of parameters (e.g., of quantities or conditions), unless otherwise indicated expressly or clearly in view of the context, including the appended claims, are to be understood as being modified in all instances by the term "about" whether or not "about" actually appears before the value. A component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims. Although several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. A method for cycle life management of a mixed chemistry battery pack configured for electrically powering a traction motor of a vehicle, the mixed chemistry battery pack including an energy subpack connected in parallel with a propulsion subpack, the method comprising:

determining a driving load request for the mixed chemistry battery pack to provide a requested amount of electrical power to the traction motor for purposes of driving the vehicle;

determining a state of charge (SOC) threshold having an upper limit and a lower limit for the propulsion subpack;

determining a nominal current limit and a maximum current limit for the energy subpack, the energy subpack configured for providing less maximum power than the propulsion subpack and longer consistent power than the propulsion subpack; and generating a battery request in response to the driving load request;

wherein the battery request is operable for:

controlling the mixed chemistry battery pack to provide the requested amount of electrical power from the mixed chemistry battery pack and manage a cycle life of the mixed chemistry battery pack;

controlling the propulsion subpack to supply electrical power to meet the requested amount of electrical power without electrical power assistance from the energy subpack during a first power stage occurring prior to an SOC of the propulsion subpack reaching the upper limit; and controlling the energy subpack to provide:

an assistive amount of electrical power to supplement the propulsion subpack in meeting the requested amount of electrical power without exceeding the nominal current limit during a second power stage occurring after the first power stage upon the SOC of the propulsion subpack reaching the upper limit and prior to surpassing the lower limit;

the assistive amount of electrical power according to a relaxed current limit during a third power stage occurring after the second power stage upon the SOC of the propulsion subpack reaching the lower limit and prior to surpassing the upper limit, the relaxed current limit being greater than the nominal current limit and less than or equal to the maximum current limit; and the assistive amount of electrical power without exceeding the nominal current limit during a fourth power stage occurring after the third power stage upon the SOC of the propulsion subpack reaching the upper limit.

2. The method according to claim 1, wherein:

the battery request is operable for maximizing the cycle life by prioritizing charging and discharging of the propulsion subpack over the energy subpack.

3. The method according to claim 1, further comprising:

adjusting the relaxed current limit during the third power stage in proportion to the SOC of the propulsion subpack increasing from the lower limit to the upper limit.

4. The method according to claim 1, further comprising:

adjusting the relaxed current limit during the third power stage at a predetermined rate as the SOC of the propulsion subpack increases from the lower limit to the upper limit.

5. The method according to claim 1, further comprising:

determining a charging load request for the energy subpack to provide a charging amount of electrical power to the propulsion subpack for purposes of charging the propulsion subpack; and generating a charging request operable for controlling the energy subpack to provide the charging amount of electrical power to the propulsion subpack.

6. The method according to claim 5, further comprising:

determining the charging load request in response to the vehicle being stationary for a predefined period of time and the SOC being at or below the lower limit.

7. The method according to claim 5, wherein:

the charging request is operable for controlling the energy subpack to provide the charging amount of electrical power without exceeding the nominal current limit.

8. The method according to claim 5, wherein:

the charging request is operable for controlling the energy subpack to provide the charging amount of electrical power at a selectable rate.

9. The method according to claim 1, further comprising:

determining a warming load request for the energy subpack to provide a warming amount of electrical power to the propulsion subpack for purposes of warming the propulsion subpack; and generating a warming request operable for controlling the energy subpack to provide the warming amount of electrical power to the propulsion subpack.

10. The method according to claim 9, further comprising:

determining the warming load request in response to the vehicle being stationary for a predefined period of time.

11. The method according to claim 1, further comprising:

the battery request being operable for controller a converter of the mixed chemistry battery pack to control electrical power transfer between the propulsion sub-pack and the energy subpack.

12. The method according to claim 11, wherein:

the converter is a direct current (DC)-to-DC converter connected in parallel between the propulsion subpack and the energy subpack.

13. A cycle life managed mixed chemistry battery pack configured for electrically powering a traction motor of a vehicle, the cycle life managed mixed chemistry battery pack comprising:

a propulsion subpack;

an energy subpack;

a converter configured for controlling electrical energy transfer from the energy subpack to the propulsion subpack; and a controller configured for:

determining a driving load request for the mixed chemistry battery pack to provide a requested amount of electrical power to the traction motor for purposes of driving the vehicle;

determining a state of charge (SOC) threshold having an upper limit and a lower limit for the propulsion subpack;

determining a nominal current limit and a maximum current limit for the energy subpack, the energy subpack configured for providing less maximum power than the propulsion subpack and longer consistent power than the propulsion subpack; and generating a battery request in response to the driving load request;

wherein the battery request is operable for:

controlling the mixed chemistry battery pack to provide the requested amount of electrical power from the mixed chemistry battery pack and manage a cycle life of the mixed chemistry battery pack;

controlling the propulsion subpack to supply electrical power to meet the requested amount of electrical power without electrical power assistance from the energy subpack during a first power stage occurring prior to an SOC of the propulsion subpack reaching the upper limit; and controlling the energy subpack to provide:

an assistive amount of electrical power to supplement the propulsion subpack in meeting the requested amount of electrical power without exceeding the nominal current limit during a second power stage occurring after the first power stage upon the SOC of the propulsion subpack reaching the upper limit and prior to surpassing the lower limit;

the assistive amount of electrical power according to a relaxed current limit during a third power stage occurring after the second power stage upon the SOC of the propulsion subpack reaching the lower limit and prior to surpassing the upper limit, the relaxed current limit being greater than the nominal current limit and less than or equal to the maximum current limit; and the assistive amount of electrical power without exceeding the nominal current limit during a fourth power stage occurring after the third power stage upon the SOC of the propulsion subpack reaching the upper limit.

14. The cycle life managed mixed chemistry battery pack according to claim 13, wherein:

the controller is configured for maximizing the cycle life by minimizing charging and discharging of the energy subpack relative to the propulsion subpack.

15. A cycle life managed electrical power system for powering a traction motor of a vehicle, the cycle life managed electrical power system comprising:

a mixed chemistry battery pack having a propulsion subpack, an energy subpack, and a converter configured for controlling electrical power transfer from the energy subpack to the propulsion subpack; and a controller configured for:

determining a driving load request for the mixed chemistry battery pack to provide a requested amount of electrical power to the traction motor for purposes of driving the vehicle;

determining a state of charge (SOC) threshold having an upper limit and a lower limit for the propulsion subpack;

determining a nominal current limit and a maximum current limit for the energy subpack, the energy subpack configured for providing less maximum power than the propulsion subpack and longer consistent power than the propulsion subpack; and generating a battery request in response to the driving load request;

wherein the battery request is operable for:

controlling the mixed chemistry battery pack to provide the requested amount of electrical power from the mixed chemistry battery pack and manage a cycle life of the mixed chemistry battery pack;

controlling the propulsion subpack to supply electrical power to meet the requested amount of electrical power without electrical power assistance from the energy subpack during a first power stage occurring prior to an SOC of the propulsion subpack reaching the upper limit; and controlling the energy subpack to provide:

an assistive amount of electrical power to supplement the propulsion subpack in meeting the requested amount of electrical power without exceeding the nominal current limit during a second power stage occurring after the first power stage upon the SOC of the propulsion subpack reaching the upper limit and prior to surpassing the lower limit;

the assistive amount of electrical power according to a relaxed current limit during a third power stage occurring after the second power stage upon the SOC of the propulsion subpack reaching the lower limit and prior to surpassing the upper limit, the relaxed current limit being greater than the nominal current limit and less than or equal to the maximum current limit; and the assistive amount of electrical power without exceeding the nominal current limit during a fourth power stage occurring after the third power stage upon the SOC of the propulsion subpack reaching the upper limit.

16. The method according to claim 1, further including enhancing the cycle life by selectively and independently managing the discharging and charging of the energy subpack and the propulsion subpack.

17. The method according to claim 1, further including individually controlling the charging and discharging of the energy subpack and the propulsion subpack.

18. The cycle life managed mixed chemistry battery pack according to claim 13, wherein:

the battery request is operable for maximizing the cycle life by prioritizing charging and discharging of the propulsion subpack over the energy subpack.

19. The cycle life managed mixed chemistry battery pack according to claim 13, further comprising:

determining a charging load request for the energy subpack to provide a charging amount of electrical power to the propulsion subpack for purposes of charging the propulsion subpack; and generating a charging request operable for controlling the energy subpack to provide the charging amount of electrical power to the propulsion subpack.

20. The cycle life managed electrical power system according to claim 15, wherein:

the battery request is operable for maximizing the cycle life by prioritizing charging and discharging of the propulsion subpack over the energy subpack.

* * * * *